United States Patent
Yoshida et al.

(10) Patent No.: US 8,459,150 B2
(45) Date of Patent: Jun. 11, 2013

(54) SEALING DEVICE

(75) Inventors: Masaki Yoshida, Kodaira (JP); Yuji Takeda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 244 days.

(21) Appl. No.: 12/520,663

(22) PCT Filed: Dec. 19, 2007

(86) PCT No.: PCT/JP2007/074428
§ 371 (c)(1),
(2), (4) Date: Jun. 22, 2009

(87) PCT Pub. No.: WO2008/075719
PCT Pub. Date: Jun. 26, 2008

(65) Prior Publication Data
US 2010/0101375 A1    Apr. 29, 2010

(30) Foreign Application Priority Data
Dec. 21, 2006 (JP) ................................. 2006-344445

(51) Int. Cl.
*B29C 73/08* (2006.01)

(52) U.S. Cl.
USPC ............... 81/15.6; 81/15.5; 81/15.3; 81/15.7; 141/38; 141/192

(58) Field of Classification Search
USPC .................. 81/15.6, 15.5, 153, 15.7; 141/38, 141/192; 222/74, 160, 173, 251
See application file for complete search history.

(56) References Cited

U.S. PATENT DOCUMENTS

| | | | |
|---|---|---|---|
| 5,746,976 A * | 5/1998 | Yamada et al. | 422/62 |
| 6,789,581 B2 * | 9/2004 | Cowan et al. | 141/38 |
| 7,789,110 B2 * | 9/2010 | Marini | 141/38 |
| 2003/0056851 A1 * | 3/2003 | Eriksen et al. | 141/38 |
| 2004/0112462 A1 * | 6/2004 | Kelsey et al. | 141/346 |
| 2004/0173282 A1 | 9/2004 | Laetgaard | |
| 2009/0266440 A1 * | 10/2009 | Lolli et al. | 141/38 |
| 2010/0224281 A1 * | 9/2010 | Yoshida et al. | 141/38 |

FOREIGN PATENT DOCUMENTS

| | | |
|---|---|---|
| DE | 20212101 U1 | 2/2003 |
| DE | 102005021073 A1 | 11/2006 |
| EP | 1493550 A1 | 1/2005 |

(Continued)

OTHER PUBLICATIONS

Extended European Search Report issued Oct. 23, 2012 in counterpart European Application No. 07850898.3.

(Continued)

*Primary Examiner* — Monica Carter
*Assistant Examiner* — Melanie Alexander
(74) *Attorney, Agent, or Firm* — Sughrue Mion, PLLC

(57) ABSTRACT

Provide a sealing device with which simple and reliable operation can be performed. When stored, a liquid agent container, in which a sealing agent is contained, is temporarily held above a injection unit. When the liquid agent container is forcibly pressed downward in use, the upper end of a pressing jig penetrates through an aluminum seal into the container, and the sealing agent flows out to a compressor unit is activated and compressed air is supplied into the liquid agent container to place the pressurized sealing agent into a pneumatic tire through a joint hose.

13 Claims, 11 Drawing Sheets

FOREIGN PATENT DOCUMENTS

| | | |
|---|---|---|
| JP | 2000-309254 A | 11/2000 |
| JP | 2005-199618 A | 7/2005 |
| JP | 2005-254617 A | 9/2005 |
| JP | 2005-319615 A | 11/2005 |
| JP | 2005-335155 A | 12/2005 |
| WO | 2007/063852 A | 6/2007 |

OTHER PUBLICATIONS

Japanese Office Action mailed Aug. 14, 2012 for corresponding Japanese Application No. 2006-344445.

\* cited by examiner

SEALING DEVICE

CROSS REFERENCE TO RELATED APPLICATION

This application is a National Stage of International Application No. PCT/JP2007/074428 filed Dec. 19, 2007, claiming priority based on Japanese Patent Application No. 2006-344445 filed Dec. 21, 2006, the contents of all of which are incorporated herein by reference in their entirety.

TECHNICAL FIELD

The present invention relates to a sealing device for injecting a sealing agent for sealing punctured pneumatic tires into a pneumatic tire.

RELATED ART

Recently, sealing devices are becoming common which, when pneumatic tires (referred to below simply as tires) are punctured, repair the tire with a sealing agent, rather than changing the tire or the wheel. The sealing device described in Patent Document 1, for example, is a known example of such a sealing device.

The sealing device disclosed in Patent Document 1 is equipped with a liquid agent container in which puncture sealing agent is contained, and with a storage portion for replaceable storing having an outlet that is tightly sealed with a rupturable lid portion (seal member) formed from aluminum foil or the like, and a unit body (injection unit) provided with a housing having a cylindrical body portion and a piston shaped change-over tool moveably disposed within the unit body.

The body portion of the housing is provided with an inflow aperture (air supply aperture) communicating with a compressed air source, and a discharge aperture in communication with a tire. The change-over tool is moveable from a position separated from the seal member within the body portion (a retracted position) to a position for rupturing the seal member with leading end rupturing portions (knife portions) (a rupturing position).

When the sealing device of Patent Document 1 is used, first the device is inverted so that the bottom faces up, a jig is inserted from the upward-facing bottom portion, moving the change-over tool inside the device. When the change-over tool is in the retracted position the inflow aperture is in communication with the discharge aperture through a main communication path formed in the change-over tool, and compressed air that has been supplied from the compressed air source into body portion is then supplied into a tire. When the change-over tool has moved as far as the rupturing position, compressed air supplied from the compressed air source is supplied into the liquid agent container through the main communication path of the change-over tool. Sealing agent is thereby pushed out from an out-feed aperture due to the static pressure of an air pocket formed within the liquid agent container, and the sealing agent is supplied into the tire through a gap formed within the body portion between the inner peripheral face of the body portion and the outer peripheral face of the change-over tool and through the discharge aperture.

Patent Document 1: Japanese Patent Application Laid-Open No. 2005-199618.

DISCLOSURE OF THE INVENTION

Problem to be Solved by the Invention

In known sealing devices, prior to supplying sealing agent operations are performed to insert the jig after inverting the device, and to right the device after the jig has been inserted, and these operations lead to the following problems.

(1) There is a concern that when operating, an operator does not understand inverting the device, this readily leading to mistaken operation.

(2) The operation to invert the device is troublesome.

The present invention is made in consideration of the above circumstances and an object thereof is to provide a sealing device with which simple and reliable operation can be performed.

Method of Solving the Problem

A sealing device of the first aspect of the invention including: a liquid agent container in which a sealing agent is contained, the liquid agent container having a discharge aperture at a bottom portion thereof for discharging the sealing agent, and the discharge aperture being sealed by a seal member; an injection unit disposed further down than the discharge aperture, the injection unit opening the seal member by the liquid agent container moving downward, letting the sealing agent flow out from the discharge aperture; and a supply means for applying pressure to the sealing agent and supplying the sealing agent into a pneumatic tire.

Explanation will now be given of the operation of the sealing device of the first aspect of the invention.

When sealing agent is to be supplied into a pneumatic tire using the sealing device of the first aspect of the invention, first the liquid agent container is pressed and moved downward. The seal member is thereby opened by the injection unit, and the sealing agent in the liquid agent container flows out from the discharge aperture. The sealing agent that flows out in this manner can be injected inside the pneumatic tire by application of pressure applied by the supply means. The hole in the pneumatic tire is plugged by the sealing agent supplied therein.

The second aspect of the invention is the sealing device of the first aspect of the invention further including a return prevention means for preventing movement of the liquid agent container in a direction of separation from the injection unit.

Explanation will now be given of the operation of the sealing device of the second aspect of the invention.

The liquid agent container receives force in the direction of separation from the injection unit due to pressure being applied to the sealing agent by the supply means. The liquid agent container can be prevented from separating away from the injection unit while pressure is being applied by the return prevention means preventing movement of the liquid agent container in the direction of separation from the injection unit.

The third aspect of the invention is the sealing device of the second aspects of the invention, wherein the return prevention means has a projection formed to an outer peripheral face of the liquid agent container and a catch portion provided to a case housing the liquid agent container, the catch portion catching on the projection when the liquid agent container moves in the direction of separation from the injection unit.

Explanation will now be given of the operation of the sealing device the third aspect of the invention.

In the sealing device of the third aspect of the invention, when the injection unit moves in the direction of separation from the injection unit the catch portion provided to the case catches on the projection formed to the outer peripheral face of the liquid agent container, preventing movement of the liquid agent container in the direction of separation from the injection unit.

The fourth aspect of the invention is the sealing device of any one of the first to third aspects of the invention, further including means of guiding the liquid agent container when moving toward the injection unit.

Explanation will now be given of the operation of the sealing device of the fourth aspect of the invention.

In the sealing device of the fourth aspect of the invention, the liquid agent container is guided by a guide when the liquid agent container moves, reliably moving toward the injection unit. The seal member of the liquid agent container can thereby be reliably opened by the injection unit.

The fifth aspect of the invention is the sealing device of any one of the fourth aspect of the invention, wherein the guide means has a rib provided to an outer peripheral face of the liquid agent container formed along a direction of movement of the liquid agent container, and a groove provided to a case housing the liquid agent container, slidably supporting the rib.

Explanation will now be given of the operation of the sealing device of the fifth aspect of the invention.

In the sealing device of the fifth aspect of the invention, the liquid agent container is guided by the rib of the liquid agent container sliding in the groove of the case.

The rib of the case also acts as reinforcement of the liquid agent container, and the pressure resistance of the liquid agent container can also be raised.

The sixth aspect of the invention is the sealing device of any one of the first to fifth aspects of the invention, further including a temporary retaining means for temporarily retaining the liquid agent container.

Explanation will now be given of the operation of the sealing device of the sixth aspect of the invention.

In the sealing device of the sixth aspect of the invention, the liquid agent container is temporarily retained by the temporary retaining means, and unintentional movement of the liquid agent container, due to vibration or the like, can be prevented.

The seventh aspect of the invention is the sealing device of any one of the first to sixth aspects of the invention, further including a safety pin, detachably provided to the liquid agent container, the safety pin preventing movement of the liquid agent container when engaged with the liquid agent container, and permitting movement of the liquid agent container by separation from the liquid agent container.

Explanation will now be given of the operation of the sealing device of the seventh aspect of the invention.

When the sealing device is to be used the liquid agent container can be moved toward the injection unit by separating the safety pin from the liquid agent container. Movement of the liquid agent container is also prevented when the safety pin is engaged with the liquid agent container, and opening of the seal member can be reliably prevented.

The eighth aspect of the invention is the sealing device of any one of the first to seventh aspects of the invention, wherein the injection unit is equipped with a rupturing part that ruptures the seal member by insertion into the discharge aperture of the liquid agent container.

Explanation will now be given of the operation of the sealing device of the eighth aspect of the invention.

In the sealing device of the eighth aspect of the invention the seal member that seals the discharge aperture can be ruptured by the rupturing part, so that sealing agent inside the container can be reliably caused to flow out from the discharge aperture.

Effect of the Invention

As explained above, in the sealing device of the first aspect of the invention the sealing agent in the liquid agent container can be made to flow out of the discharge aperture by pressing the liquid agent container and moving the liquid agent container downward, and effects such as the following are obtained.

Firstly, operation is simply and reliably performed in comparison to known sealing devices with methods using jigs, in which the known sealing device is first turned upside down (inverted) then the liquid agent container opened with the jig, with sealing agent subsequently supplied after righting the sealing device.

The top face of the device is not dirtied by contacting a road surface and there is no leaking since the sealing device is not inverted.

In the sealing device of the second aspect of the invention, by configuring as described above the liquid agent container can be prevented from separating away from the injection unit during pressure application, and sealing agent can be prevented from leaking out.

In the sealing device of the third aspect of the invention movement of the liquid agent container in the direction of separation from the injection unit can be prevented with a simple configuration of a projection and a catch portion.

In the sealing device of the fourth aspect of the invention, by configuring as described above the seal member of the liquid agent container can be reliably opened by the injection unit.

In the sealing device of the fifth aspect of the invention, the liquid agent container can be guided with a simple configuration of a rib and a groove. The rib also acts as reinforcement of the liquid agent container, and the pressure resistance of the liquid agent container can be raised.

In the sealing device of the sixth aspect of the invention, the liquid agent container is temporarily retained by the temporary retaining means, and unintentional movement of the liquid agent container, due to vibration or the like, can be prevented.

In the sealing device of the seventh aspect of the invention, opening of the seal member can be reliably prevented by engaging the safety pin with the liquid agent container. In the sealing device of the eighth aspect of the invention, the sealing agent in the container can be reliably made to flow out from the discharge aperture by the rupturing part.

BRIEF DESCRIPTION OF THE DRAWINGS

FIG. 5 is a cross-section showing a configuration of a liquid agent container, an injection unit and a pressing jig when the liquid agent container has been pressed in.

FIG. 8 is a perspective drawing of a sealing device when a liquid agent container has been pressed in.

FIG. 10 is a cross-section showing a configuration of a liquid agent container, an injection unit and a pressing jig in a sealing device according to a second exemplary embodiment when the liquid agent container has been pressed in.

BEST MODE OF IMPLEMENTING THE INVENTION

First Exemplary Embodiment

Figure 1:
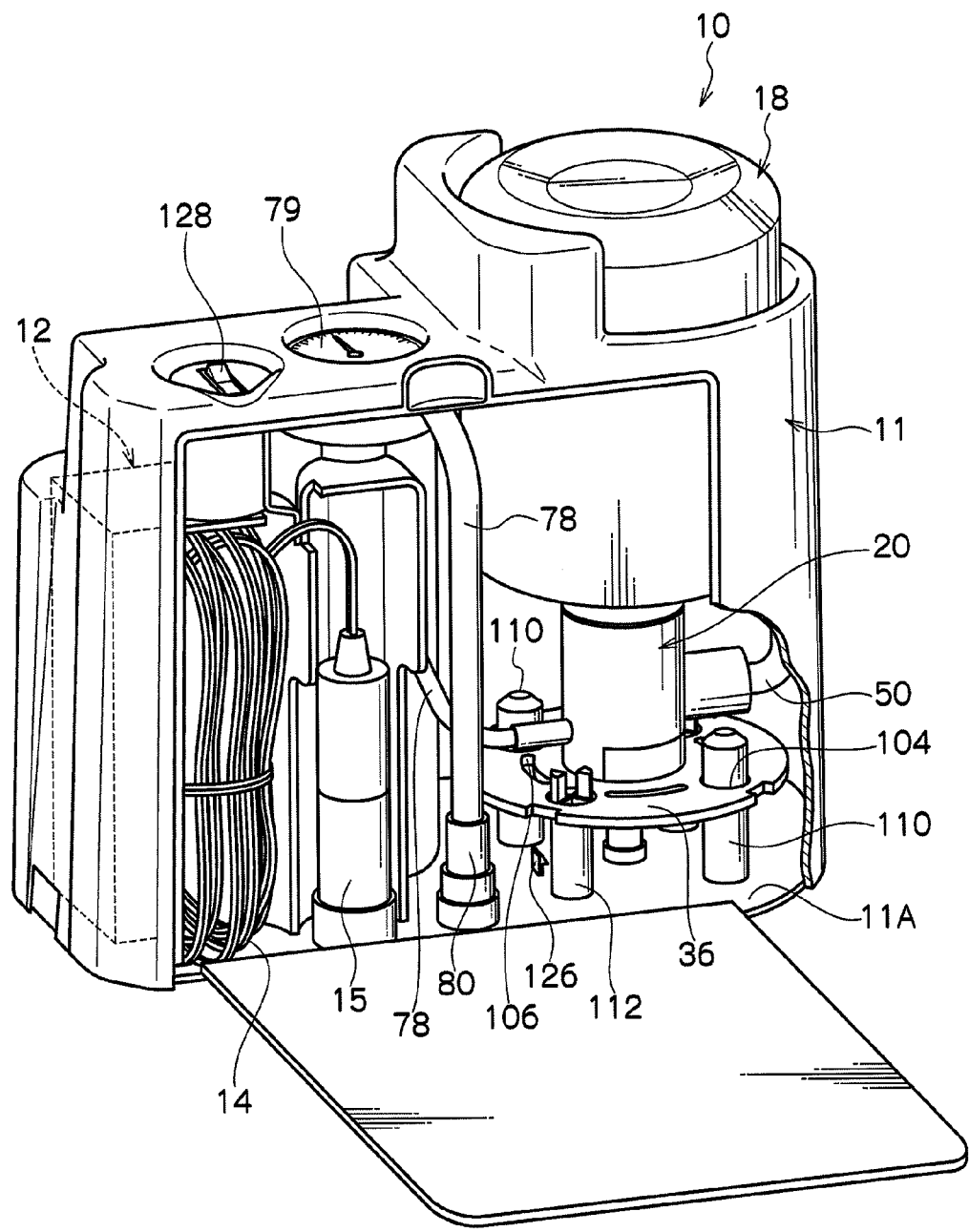
FIG. 1 is a perspective drawing showing a configuration of a sealing device according to a first exemplary embodiment of the present invention.

Explanation will now be given of a sealing device according to a first exemplary embodiment of the present invention.
Sealing Device Configuration
FIG. 1 shows a sealing device 10 according to an exemplary embodiment of the present invention. The sealing device 10 is one that when a pneumatic tire (referred to below simply as a tire) mounted to a vehicle, such as a car, is punctured, repairs the tire with a sealing agent, rather than changing the tire or the wheel.

As shown in FIG. 1, the sealing device 10 is equipped with a box shaped casing 11 as an external shell, and with a compressor unit 12, an injection unit 20, and a liquid agent container 18 connected fixed to the injection unit 20, etc. disposed within the casing 11.

A motor, air compressor, power circuit, control board etc. are disposed within the compressor unit 12, and a power source cable 14 is provided extending outside of the unit from the power source circuit. A power source can, for example, be supplied to the motor etc. from a battery mounted to a vehicle through the power circuit, by inserting a plug 15 provided at the leading end of the power source cable 14 into the socket of a cigarette lighter installed in the vehicle. The air compressor of the compressor unit 12 here is capable of generating compressed air at a pressure higher than the stipulated pressure for each of various types of tire 100 (see FIG. 2) to be repaired (for example at 300 kPa or above).

Figure 3:
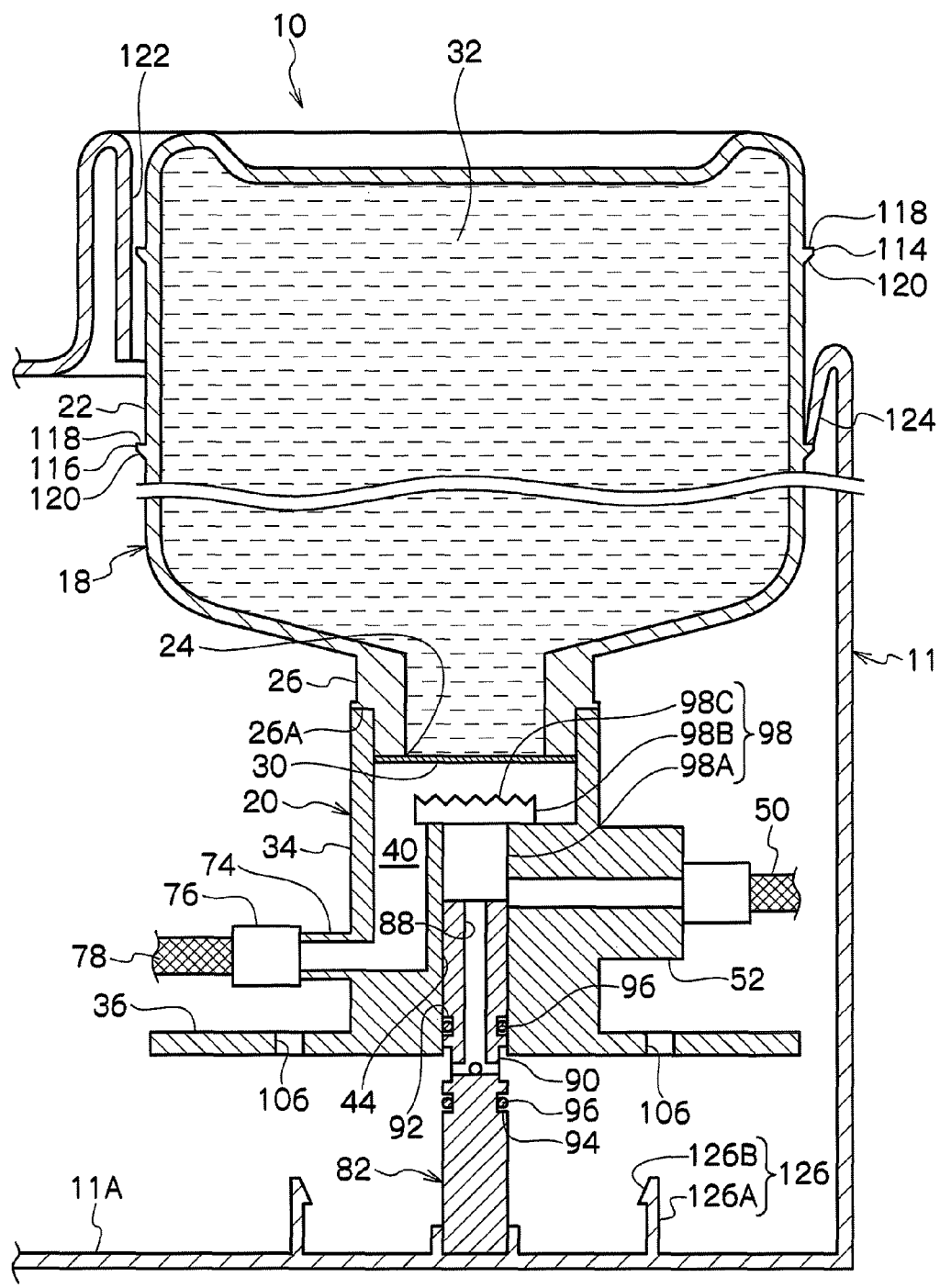
FIG. 3 is a cross-section showing a configuration of a liquid agent container, an injection unit and a pressing jig during storage.

As shown in FIG. 3, the sealing device 10 is provided with the liquid agent container 18 containing a sealing agent 32 and with the injection unit 20 to which the liquid agent container 18 is connected. A neck portion 26 is integrally formed to a portion at the bottom end of the liquid agent container 18, the neck portion 26 being substantially a circular cylinder shape projecting downwards. The neck portion 26 is formed with a diameter narrower than that of a container body portion 22 above the neck portion 26. There is a discharge aperture 24 formed at the bottom end of the neck portion 26 as a circular shaped opening for discharging the sealing agent 32, and the discharge aperture 24 is closed off by an aluminum seal 30 of membrane shape. The outer peripheral edge portion of the aluminum seal 30 is fixed around the whole of the peripheral edge portion of the opening of the neck portion 26, by use of an adhesive or the like.

The liquid agent container 18 here is formed from resin material, such as PP, PE etc., and the injection unit 20 too is integrally formed from the same resin material as the liquid agent container 18, such as PP, PE etc., that is joinable to the step portion 28 of the liquid agent container 18 by spin welding.

Slightly more sealing agent 32 is filled within the liquid agent container 18 than the standard amount (for example 200 g to 400 g) corresponding to the each type and size etc. of the tire 100 requiring repair by the sealing device 10. It should be noted that the liquid agent container 18 of the present exemplary embodiment is filled with the sealing agent 32 with no voids therein and without provision of an air space, however a small amount of an inert gas such as Ar or the like may be sealed together with the sealing agent 32 within the liquid agent container 18 when filling, in order to prevent alternation of the sealing agent 32 by oxidation, nitridation etc.

When the sealing device 10 is in a state in which the liquid agent container 18 is positioned directly above the injection unit 20, the aluminum seal 30 of the liquid agent container 18 is in a pressure applied state due to the weight of the sealing agent 32 itself, within the liquid agent container 18.

A unit body portion 34 and a flange 36 are integrally provided to the injection unit 20, the unit body portion 34 formed in a substantially circular bottomed cylinder shape opened to the top, and the flange 36 formed in a circular plate shape extending out to the outer peripheral side from a portion at the bottom end of the unit body portion 34.

In the sealing device 10, the liquid agent container 18 is connected and fixed to the injection unit 20 by a step portion 26A, formed to an intermediate portion of a neck portion 26 of the liquid agent container 18, being spin welded to a portion at the top end of the unit body portion 34.

When the neck portion 26 is joined to the unit body portion 34, there is a liquid supply pressure chamber 40 formed between the liquid agent container 18 and the injection unit 20. The liquid supply pressure chamber 40 is in communication with the inside of the liquid agent container 18 when the aluminum seal 30 is ruptured by a pressing jig 82 described below.

In the injection unit 20 there is a jig insertion hole 44 formed with a circular cross-section at a central portion of the unit body portion 34, passing through between the bottom end face of the injection unit 20 and the liquid supply pressure chamber 40.

A high pressure hose 50 is provided extending out from the compressor unit 12 in the sealing device 10, and the base end of the high pressure hose 50 is connected to an air compressor inside the compressor unit 12.

A circular cylindrical shaped air supply tube 52 is formed in the injection unit 20, piercing through the unit body portion 34 and extending out to the outer peripheral side, and the air supply tube 52 is in communication with the inside for the jig insertion hole 44. The leading end of the high pressure hose 50 is connected to the leading end at the outer peripheral side of the air supply tube 52.

The bar shaped pressing jig 82 used when discharging the sealing agent 32 from the liquid agent container 18 is disposed on a bottom plate 11A of the casing 11.

A jig communication path 88 is formed extending from the top face of the pressing jig 82 downward, with plural (for example 4) branches at an intermediate portion of the jig communication path 88, with the branched portions each extending to the outer peripheral side. An annular shaped communication groove 90 is formed in the outer peripheral face of the pressing jig 82, the communication groove 90 forming an air path to the opening portions of the jig communication path 88.

A fitting insertion groove 92 and a fitting insertion groove 94 are formed in the outer peripheral surface of the pressing jig 82, respectively above and below the communication groove 90. O-rings 96 are respectively fitted into the pair of fitting insertion grooves 92, 94.

A shaft portion 98A of a rupturing part 98 is inserted into the jig insertion hole 44. The rupturing part 98 is equipped at a portion at the top end of the shaft portion 98A with a boring part 98B in a circular plate shape widening out in diameter to the outside in the radial direction. Plural blades 98C are formed on the top face of the boring part 98B to facilitate rupturing of the aluminum seal 30.

The boring part 98BB directly faces the center of the aluminum seal 30, with a small gap provided between the boring part 98BB and the aluminum seal 30.

Figure 5:
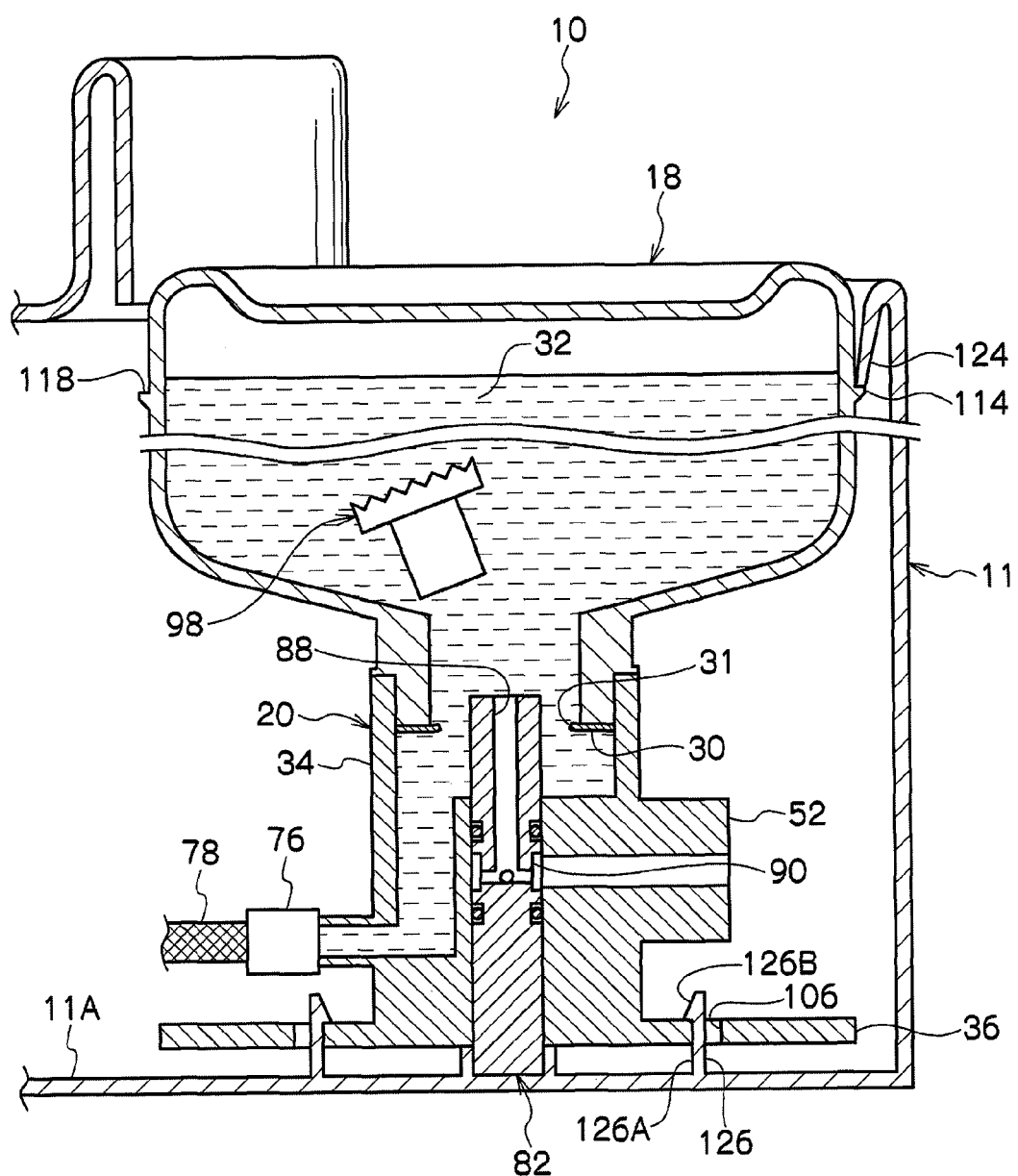

Due to the above configuration, when the pressing jig 82 is inserted into the jig insertion hole 44, the leading end of the pressing jig 82 presses the rupturing part 98, and the boring part 98B of the rupturing part 98 ruptures the aluminum seal 30, and the rupturing part 98 is pressed pushed out into the liquid agent container 18 as shown in FIG. 5.

In the state of insertion of the pressing jig 82 into the jig insertion hole 44, as shown in FIG. 5, the communication groove 90 of the pressing jig 82 and the air supply tube 52 are aligned with each other in the axial direction. The air supply tube 52 is thereby in communication with the jig communication path 88 of the pressing jig 82 through the communication groove 90. In the state of insertion of the pressing jig 82 into the jig insertion hole 44, the outer peripheral edge portions of each of the pair of O-rings 96 are in press contact along the entire circumferential direction with the inner peripheral surface of the jig insertion hole 44.

Support Structure of the Injection Unit 20

As shown in FIG. 3, the injection unit 20 is usually separated from the bottom plate 11A of the casing 11 by a specific dimension.

Figure 6:
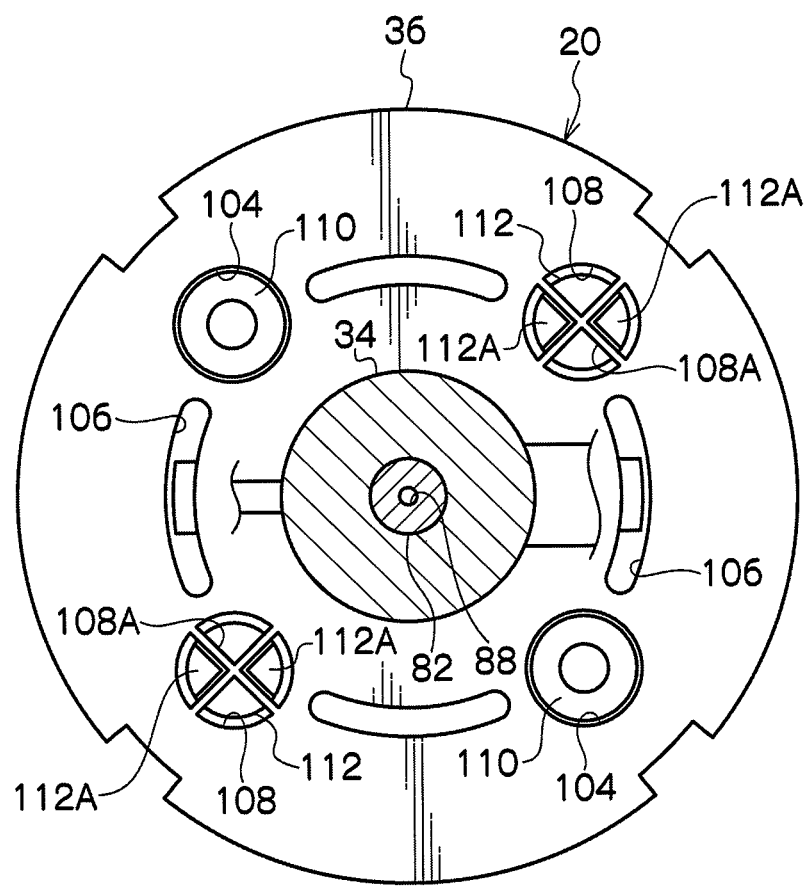
FIG. 6 is a plan view showing a flange portion of an injection unit.

As shown in FIG. 6, circular guide holes 104, long holes 106, and through holes 108 are formed to the flange 36 of the injection unit 20.

As shown in FIG. 1 and FIG. 6, a circular column shaped guide pin 110 provided projecting up from the bottom plate 11A is inserted into the circular shaped guide holes 104.

Figure 7:
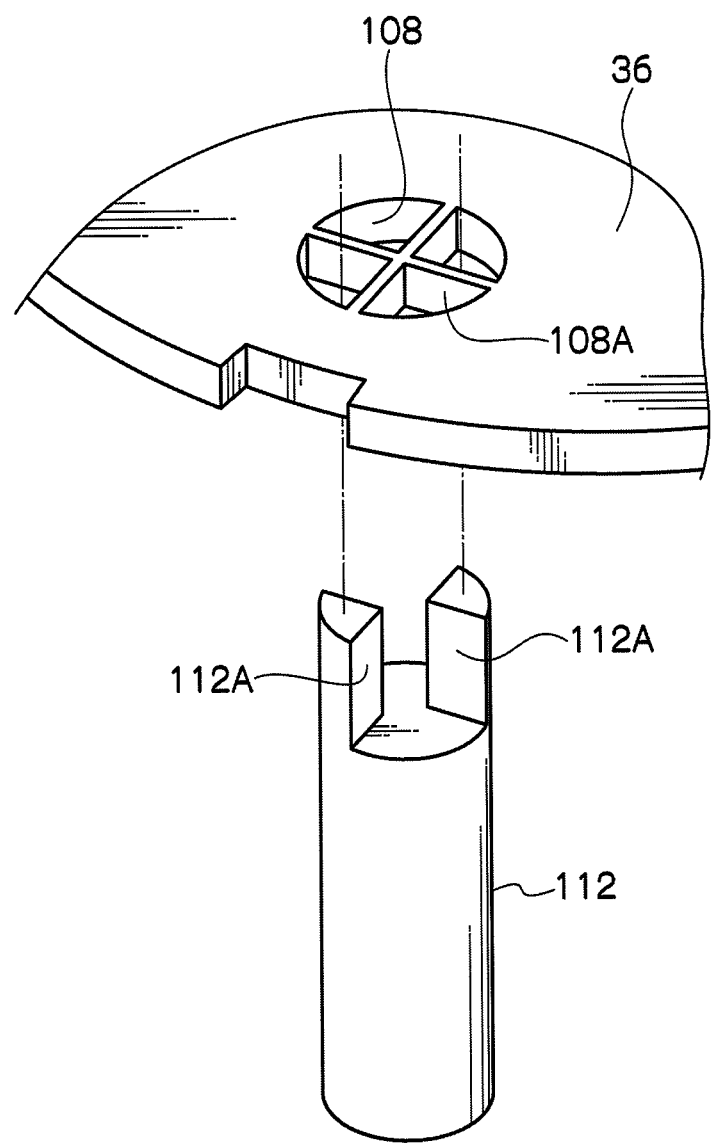
FIG. 7 is a perspective drawing showing the relationship between a flange and a stopper pin.

As shown in FIG. 7, the through holes 108 are circular holes provided at inner peripheral portions thereof with bridging portions 108A in the shape of a cross, and the bridging portions 108A are installed on a top portion of circular column shaped stopper pins 112 provided projecting up from the bottom plate 11A. A pair of projections 112A are formed to the top portion of the stopper pins 112, with each of the projections 112A inserted into the vane shaped hole portions sectioned by the bridging portions 108A of the through holes 108.

The bridging portions 108A are given sufficient rigidity to support the weight of the liquid agent container 18 itself, but to break when a specific force or above acts thereon.

In a state in which the bridging portions 108A are installed on the top portion of the stopper pins 112, as shown in FIG. 3, a portion of the pressing jig 82 is in an inserted state in the jig insertion hole 44, and the rupturing portion 98B of the rupturing part 98 is separated from the aluminum seal 30 of the liquid agent container 18.

Figure 4:
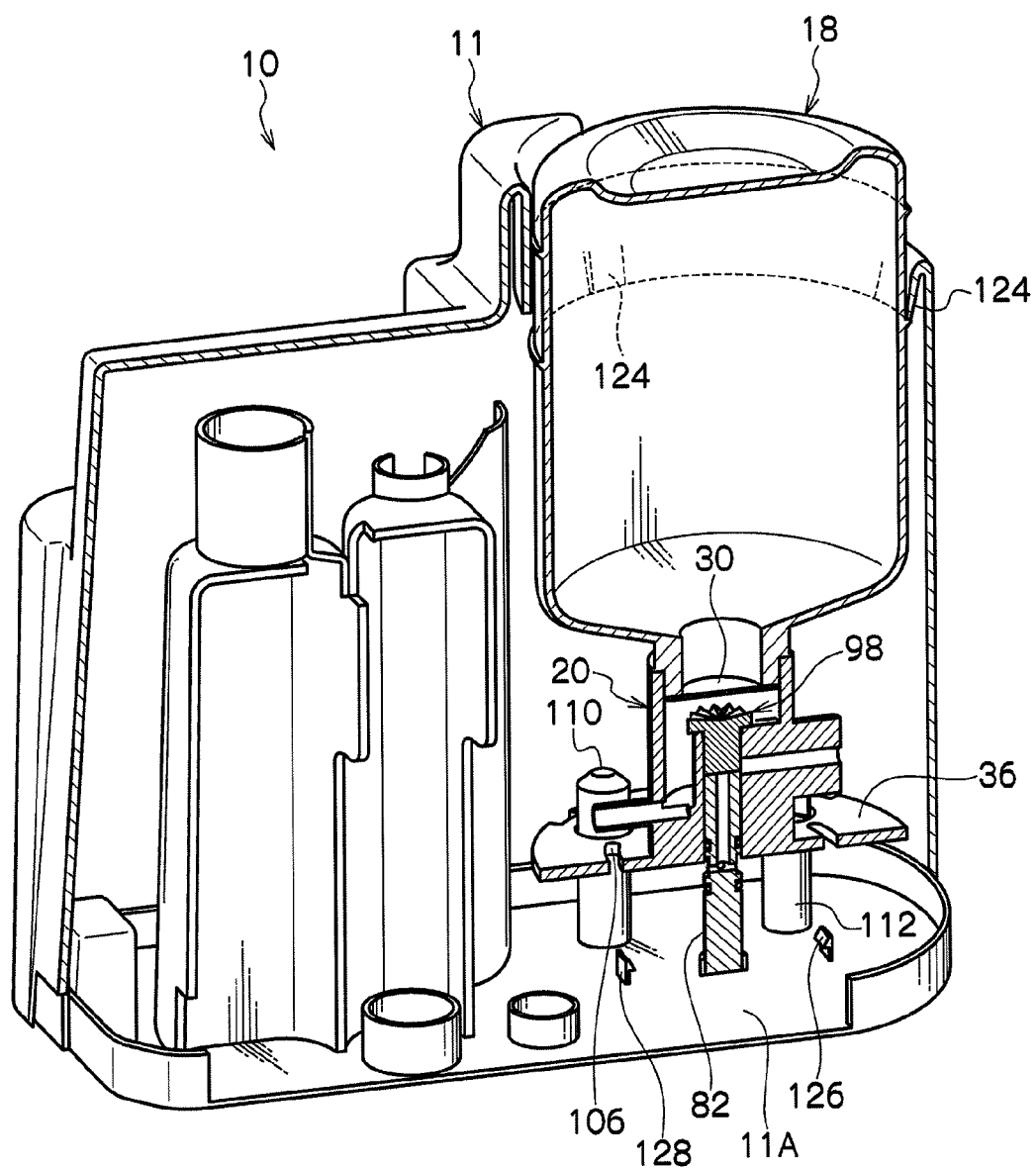
FIG. 4 is a cross-section of a sealing device during storage.

As shown in FIG. 3 and FIG. 4, a ring-shaped projection 114 is formed at the upper side of the outer peripheral face of the container body portion 22 of the liquid agent container 18, and a ring-shaped projection 116 is formed at the lower side thereof. The projection 114 and the projection 116 are equipped at the upper side with a flat face portion 118 extending to the outside in the radial direction from the outer peripheral face of the container body portion 22, and at the lower side with an inclined face 120 that is inclined with respect to the flat face portion 118.

A liquid agent container insertion hole 122 is formed to the casing 11 for insertion of the liquid agent container 18 therein. Elastically deformable tabs 124 are formed at the inner periphery of the liquid agent container 122, the tabs 124 formed so as to extend out in the direction of the hole center at a downward inclination. The tabs 124 are biased toward the container outer peripheral face, with the leading ends of the tabs 124 always maintaining contact with the flat face portion 118 of the projection 116, preventing the liquid agent container 18 from moving upward.

Flange lock tabs 126 are provided projecting up from the bottom plate 11A of the casing 11. The flange lock tabs 126 are equipped with elastically deformable plate shaped portions 126A and with a triangular shaped hook portions 126B formed to the top of the plate shaped portions.

The flange lock tabs 126 are disposed below the long holes 106 formed to the flange 36, and the plate shaped portions 126A elastically deform when the hook portions 126B are passing through the long holes 106 from below to above, when the hook portions 126B have passed completely through the long holes 106 the plate shaped portions 126A that had elastically deformed revert to their original state, as shown in FIG. 5, and the hook portions 126B catch on the edge portions of the long holes 106, preventing the injection unit 20 from moving upward.

As shown in FIG. 3, a circular cylinder shaped air-liquid supply tube 74 is integrally formed to the injection unit 20 so as to pierce through a peripheral wall portion at the bottom end side of the unit body portion 34 and communicate with the liquid supply pressure chamber 40. The base end of a joint hose 78 is connected to the leading end at the outer peripheral side of the air-liquid supply tube 74 through a nipple 76.

Figure 2:
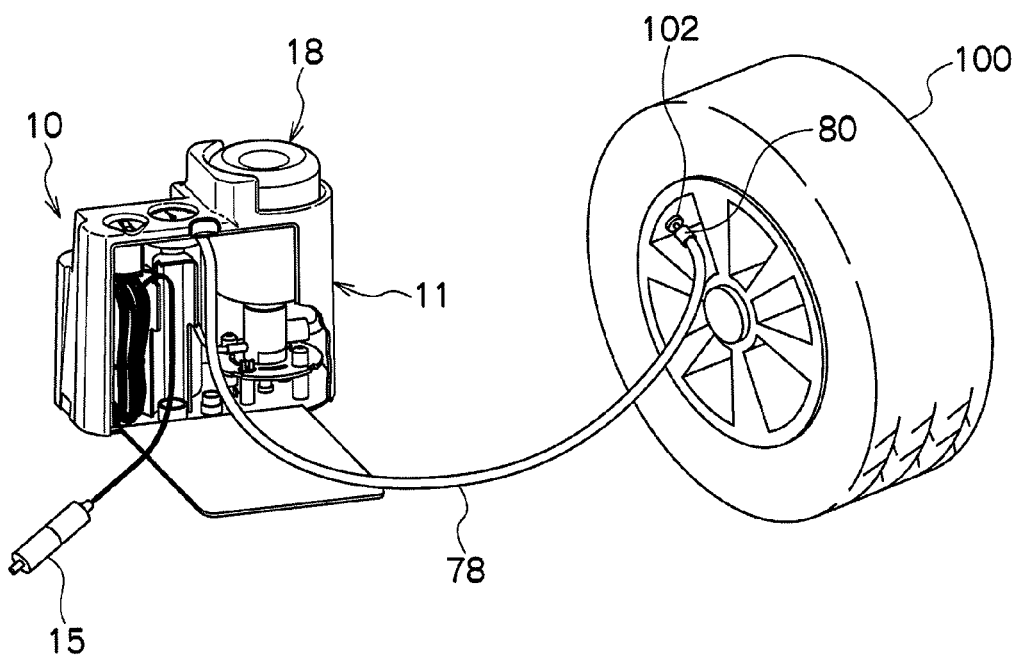
FIG. 2 is a perspective drawing showing a connection between a sealing device and a tire.

As shown in FIG. 2, a valve adapter 80 is provided to the leading end of the joint hose 78, the valve adapter 80 being detachably connectable to a tire valve 102 of the tire 100. As shown in FIG. 1, a power switch 128 for causing the motor of the compressor to rotate, and a pressure gauge 79 connected to the compressor unit 12, are provided to an upper portion of the casing 11.

Operation

Explanation will now be given of the operational procedures for repairing a punctured tire 100 using the sealing device 10 according to the present exemplary embodiment.

When a puncture has occurred in the tire 100, first an operator places the sealing device 10, such as on a road surface, so that the power switch 128 and the pressure gauge 79 face up (see FIG. 1).

Next, as shown in FIG. 2, the valve adapter 80 of the joint hose 78 is screwed onto the tire valve 102 of the tire 100. The liquid supply pressure chamber 40 is thereby made communicable with the tire 100 through the joint hose 78.

Figure 8:
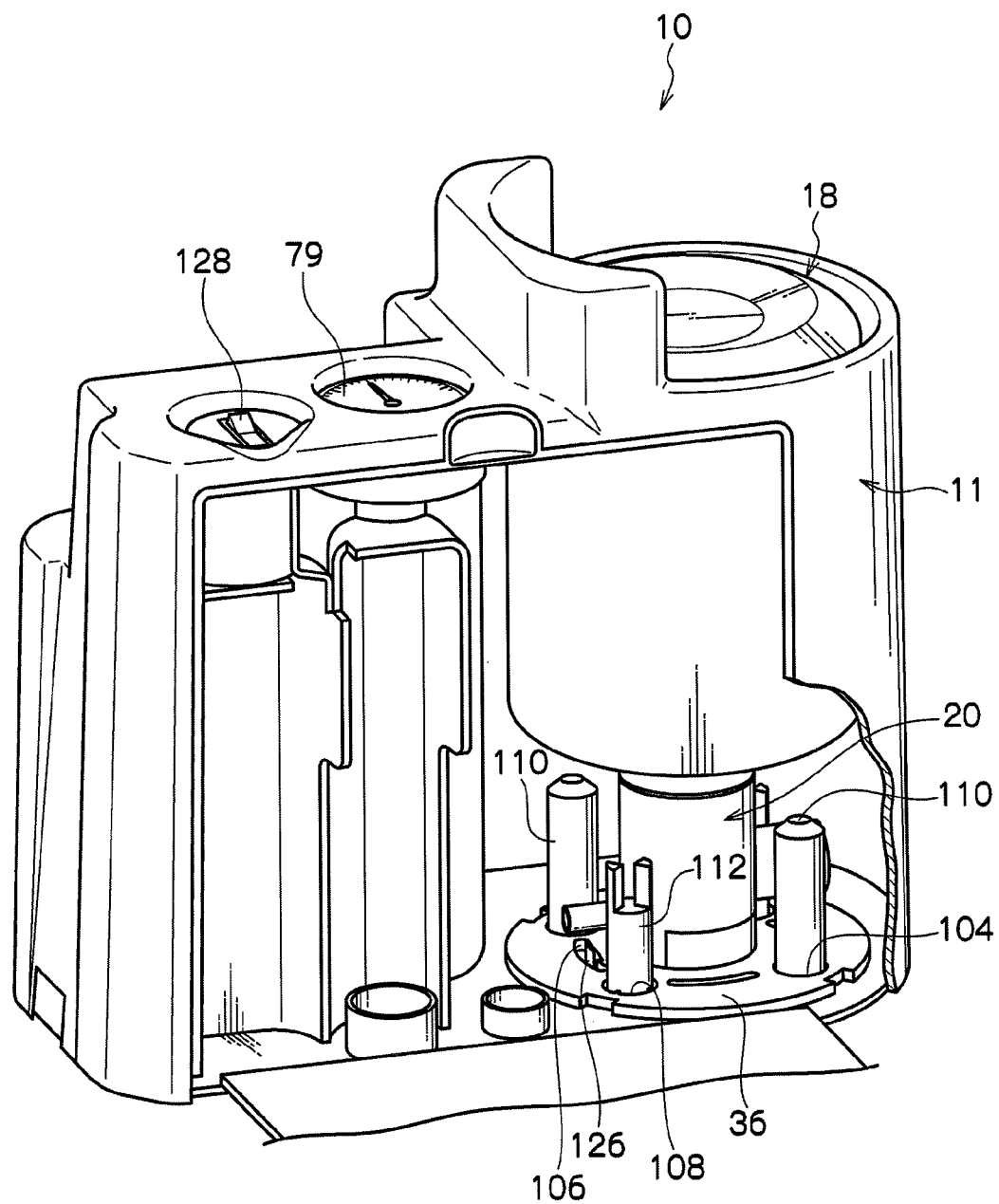

Next an operator presses the liquid agent container 18 forcibly downward, such as with their hand (see FIG. 5 and FIG. 8). The bridging portions 108A are thereby pressed and broken by the liquid agent container 122, and the injection unit 20 moves downward while being guided by the guide pin 110. Accompanying this movement, the pressing jig 82 presses the rupturing part 98 up, and the rupturing portion 98B of the rupturing part 98 ruptures the aluminum seal 30 and ingresses into the container.

When the aluminum seal 30 is ruptured, as shown in FIG. 5, the sealing agent 32 in the liquid agent container 18 flows out through a hole 31 that has been opened in the aluminum seal 30, and into the liquid supply pressure chamber 40.

When the liquid agent container 18 is pressed in, the hook portions 126B of the flange lock tabs 126 formed to the bottom plate 11A of the casing 11 catch on the edge portions of the long holes 106 formed to the flange 36, the projection 114 of the liquid agent container 18 passes the leading end of the tabs 124 formed to the liquid agent container 122 of the casing 11, and the leading ends of the tabs 124 make contact with the upper side of the flat face portion 118 of the projection 114.

After the liquid agent container 18 has been pressed in in this manner, the power switch 128 is switched on, and the compressor unit 12 is actuated. Compressed air generated by the compressor unit 12 is supplied into the liquid agent container 18 through the jig communication path 88. When compressed air is supplied into the liquid agent container 18, the compressed air rises to the top of the sealing agent 32 within the liquid agent container 18, and a space (air layer) is formed in the liquid agent container 18 above the sealing agent 32. The sealing agent 32 to which pressure is applied by the air pressure from the air layer, is supplied into the liquid supply pressure chamber 40 through the hole 31 opened in the aluminum seal 30, and injected from within the liquid supply pressure chamber 40 into the pneumatic tire 100 through the joint hose 78.

When compressed air is supplied into the liquid agent container 18, pressure is exerted on the top end of the pressing jig 82 and force acts in the direction to remove the pressing jig 82 from the jig insertion hole 44, namely force to move the liquid agent container 18 and the injection unit 20 upward. However, the leading ends of the tabs 124 of the casing 11 contact the flat face portion 118 of the projection 114, preventing movement of the liquid agent container 18 upward, and the hook portions 126B of the flange lock tabs 126 provided to the bottom plate 11A of the casing 11 also catch on the edge portions of the long holes 106 of the flange 36, preventing movement of the injection unit 20 upward, preventing the pressing jig 82 from coming out from the jig insertion hole 44 and the sealing agent 32 from leaking out from the device through the jig insertion hole 44.

Note that after all of the sealing agent 32 in the liquid agent container 18 has been expelled, pressure is applied to the sealing agent 32 in the liquid supply pressure chamber 40 and the sealing agent 32 is pushed through the joint hose 78 and supplied into the pneumatic tire 100. Then, when all of the sealing agent 32 has been discharged from the liquid supply pressure chamber 40 and from the joint hose 78, compressed air is injected into the tire 100 through the liquid agent container 18, the liquid supply pressure chamber 40 and the joint hose 78.

Next, when an operator has confirmed with the pressure gauge 79 that the internal pressure of the tire 100 has reached the stipulated pressure, the compressor unit 12 halted, and the valve adapter 80 is removed from the tire valve 102.

Within a specific period of time after finishing inflating the tire 100 the operator performs preparatory running of the tire by traveling a specific distance using the sealing agent 32 injected tire 100. The sealing agent 32 within the tire 100 thereby spreads out uniformly, the sealing agent 32 fills the puncture hole and plugs the puncture hole. After completing preparatory running the operator re-measures the internal pressure of the tire 100, and if required re-screws the valve adapter 80 of the joint hose 78 onto the tire valve 102, re-actuates the compressor unit 12 and pressurizes the tire 100 to the stipulated internal pressure. Puncture repair of the tire 100 is thereby completed and it is possible to drive using the tire 100 within a specific distance range while not exceeding a specific speed (for example not exceeding 80 km/h).

The sealing device 10 of the present exemplary embodiment has the following merits.

(1) Any concern of mis-operation occurring during operation is removed since the sealing device 10 is not inverted.

(2) The power switch 128 and the pressure gauge 79 provided to the top face of the device are not dirtied on the ground and there is no leakage during operation, since the sealing device 10 is not inverted.

(3) Operation is simplified with respect to previously since there is no need to invert the sealing device 10.

(4) Operation of the sealing device 10 of the present exemplary embodiment is simple and there is also no concern that a jig is lost, in comparison to modes of operation of known devices in which a small jig is inserted into a hole, since it is sufficient just to press in the liquid agent container 18.

Second Exemplary Embodiment

Explanation will now be given of a sealing device 10 according to a second exemplary embodiment, with reference to FIG. 9 and FIG. 10. Similar parts to that of the first exemplary embodiment are allocated the same reference numerals and explanation thereof is omitted.

Figure 9:
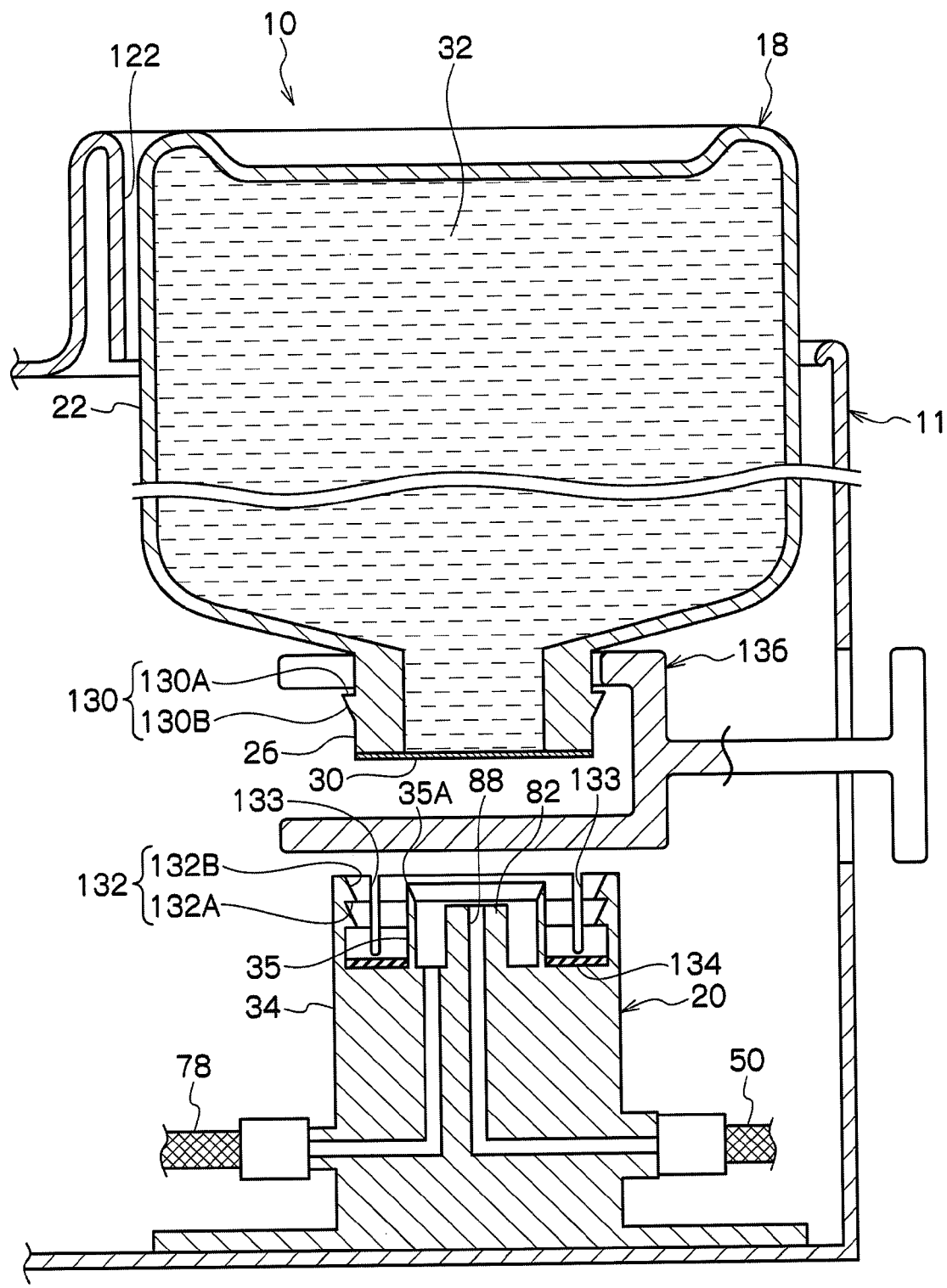
FIG. 9 is a cross-section showing a configuration of a liquid agent container, an injection unit and a pressing jig in a sealing device according to a second exemplary embodiment during storage.

As shown in FIG. 9, a ring-shaped protrusion 130 is formed to the outer periphery of the neck portion 26 of the liquid agent container 18 of the present exemplary embodiment. The protrusion 130 has an upper face of a flat face portion 130A extending toward the outside in the radial direction and a lower face of an inclined face 130B that is inclined with respect to the flat face portion 130A.

The injection unit 20 of the present exemplary embodiment, in contrast to that of the first exemplary embodiment, is one in which the pressing jig 82 is integrally formed thereto.

Plural catch portions 132 are formed along the axial direction to the inner peripheral face of the unit body portion 34, the catch portions 132 formed with triangular cross-sections projecting out in ring-shapes. The catch portions 132 are formed with a lower face of a flat face portion 132A and an upper face of an inclined face 132B that is inclined with respect to the flat face portion 132A. Plural dividing grooves 133 are formed to the circular cylinder portion of the unit body portion 34 extending in the axial direction, and portions of the circular cylinder portion divided by the dividing grooves 133 are elastically deformable in their respective radially expanding directions.

Figure 10:
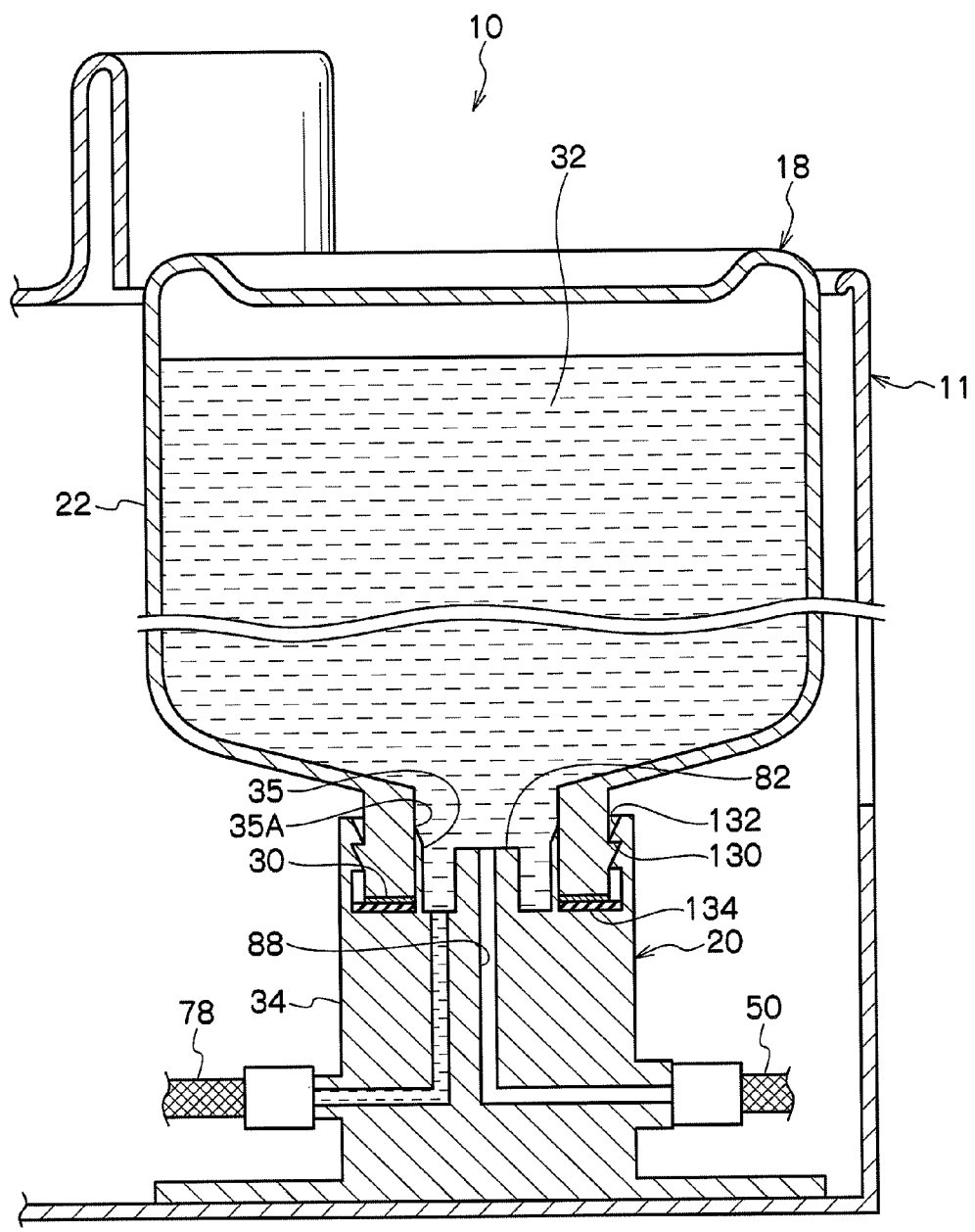

In the present exemplary embodiment, as shown in FIG. 10, the neck portion 26 is insertable into the unit body portion 34, and when the protrusion 130 of the neck portion 26 passes the inclined faces 132B of the catch portions 132, the flat face portions 132A of the catch portions 132 that have been moved past interfer with the flat face portion 130A of the protrusion 130, so as to prevent upward movement of the neck portion 26. Note that when the protrusion 130 of the neck portion 26 is moving past the inclined faces 132B of the catch portions 132, the circular cylinder portion of the unit body portion 34 elastically deforms in the radially expanding direction due to being segmented by the dividing grooves 133, and returns to as previously after moving past.

As shown in FIG. 9, a circular cylinder shaped rupturing part 35 is integrally formed to a hole portion in the unit body portion 34 at the outer peripheral side of the pressing jig 82. The top end of the rupturing part 35 is formed with blades (sharp tapered corner portions) 35A to facilitate rupturing of the aluminum seal 30. The outer diameter of the rupturing part 35 is set to be slightly smaller than the inner diameter of the discharge aperture 24.

Note that a ring-shaped packing 134 of an elastic body, such as rubber, is fitted to the lower end of the hole portion of the unit body portion 34, and when the neck portion 26 is pressed in the direction into the unit body portion 34, the end portion of the neck portion 26 is in press contact with the packing 134, preventing the sealing agent 32 from leaking out from the injection unit 20.

Configuration is made such that during storage a safety pin 136 is interposed between the neck portion 26 of the liquid agent container 18 and the unit body portion 34 of the injection unit 20, and while the safety pin 136 is interposed between the neck portion 26 and the unit body portion 34 the liquid agent container 18 cannot be pressed in.

When used the liquid agent container 18 is placed in a movable state by pulling out the safety pin 136 from the side, and it becomes possible for the liquid agent container 18 to be pressed toward the injection unit 20.

In the present exemplary embodiment the blades 35A of the rupturing part 35 rupture the aluminum seal 30 by forcibly pressing in the liquid agent container 18, in a downward direction as shown in FIG. 10, discharging the sealing agent 32. Subsequent operations are similar to those of the first exemplary embodiment.

Third Exemplary Embodiment

Figure 11:
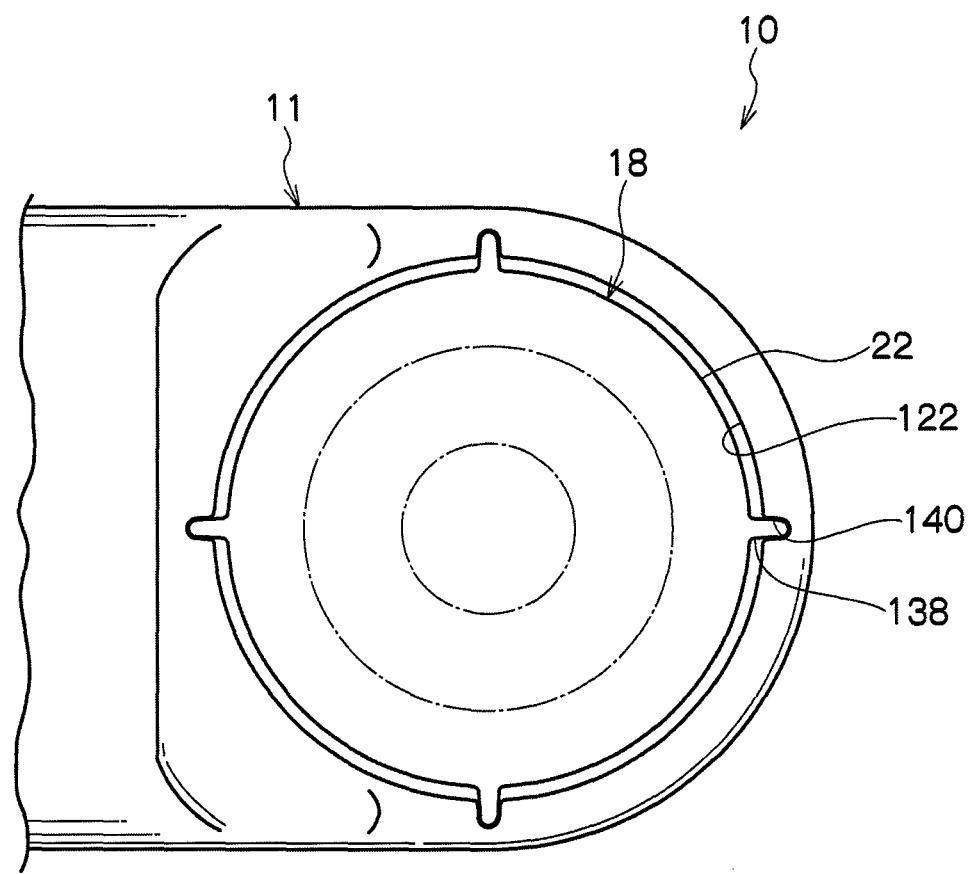
FIG. 11 is a plan view of a sealing device according to a third exemplary embodiment, as viewed from the bottom side of the container.

Explanation will now be given of a sealing device 10 according to a third exemplary embodiment, with reference to FIG. 11. Similar parts to those of previous exemplary embodiments are allocated the same reference numerals and explanation thereof is omitted. As shown in FIG. 11, the sealing device 10 of the present exemplary embodiment is an exemplary modification of the second exemplary embodiment, with plural ribs 138 formed extending along the axial direction (top-bottom direction) at the outer peripheral face of the container body portion 22 of the liquid agent container 18.

There are also plural grooves 140 formed to the liquid agent container 122 of the casing 11, extending in the top-bottom direction to slidably support the ribs 138.

In the present exemplary embodiment, movement of the liquid agent container 18 is guided by the ribs 138 and the grooves 140, and therefore when the liquid agent container 18 is pressed in, the neck portion 26 can be reliably inserted toward the inside of the unit body portion 34.

The ribs 138 also reinforce the container body portion 22, and so the pressure resistance of the liquid agent container 18 can be raised.

The invention claimed is:

1. A sealing device comprising:
   a liquid agent container in which a sealing agent is contained, the liquid agent container having a discharge aperture at a bottom portion thereof for discharging the sealing agent, and the discharge aperture being sealed by a seal member;
   a compressor for applying pressure to the sealing agent and supplying the sealing agent into a pneumatic tire;
   an injection unit disposed further down than the discharge aperture, the injection unit opening the seal member by the liquid agent container moving axially downward in a translational motion relative to the compressor and relative to the injection unit, letting the sealing agent flow out from the discharge aperture.

2. The sealing device of claim 1, further comprising a return prevention means for preventing movement of the liquid agent container in a direction of separation from the injection unit.

3. The sealing device of claim 2, wherein the return prevention means has a projection formed to an outer peripheral face of the liquid agent container and a catch portion provided to a case housing the liquid agent container, the catch portion catching on the projection when the liquid agent container moves in the direction of separation from the injection unit.

4. The sealing device of claim 1, further comprising means of guiding the liquid agent container when moving toward the injection unit.

5. The sealing device of claim 4, wherein the guide means has a rib provided to an outer peripheral face of the liquid agent container formed along a direction of movement of the liquid agent container, and a groove provided to a case housing the liquid agent container, slidably supporting the rib.

6. The sealing device of claim 1, further comprising a temporary retaining means for temporarily retaining the liquid agent container.

7. The sealing device of claim 1, wherein the injection unit is equipped with a rupturing part that ruptures the seal member by insertion into the discharge aperture of the liquid agent container.

8. A sealing device comprising:
   a liquid agent container in which a sealing agent is contained, the liquid agent container having a discharge aperture at a bottom portion thereof for discharging the sealing agent, and the discharge aperture being sealed by a seal member;
   a compressor for applying pressure to the sealing agent and supplying the sealing agent into a pneumatic tire;
   an injection unit disposed further down than the discharge aperture, the injection unit opening the seal member by the liquid agent container moving downward relative to the compressor and relative to the injection unit, letting the sealing agent flow out from the discharge aperture;
   a supply means for applying pressure to the sealing agent and supplying the sealing agent into a pneumatic tire; and
   a safety pin, detachably provided to the liquid agent container, the safety pin preventing movement of the liquid agent container when engaged with the liquid agent container, and permitting movement of the liquid agent container by separation from the liquid agent container.

9. A sealing device comprising:
   a casing;
   a liquid agent container in which a sealing agent is contained, the liquid agent container having a discharge aperture which is sealed by a seal member;
   a compressor unit disposed on the casing and which applies air to the liquid agent container;
   an injection unit connected to the discharge aperture,
   wherein the injection unit opens the seal member when the liquid agent container moves axially downward in a translational motion relative to the casing, and the sealing agent discharges from the discharge aperture.

10. The sealing device of claim 9, wherein the liquid agent container is movable from a first position in which the seal member seals the discharge aperture and a second position in which the seal member is open.

11. The sealing device of claim 10, wherein one of the liquid agent container and the casing comprises a catch and the other of the liquid agent container and the casing comprises a tab, and wherein the catch engages the tab in the second position to retain the liquid agent container in the second position.

12. The sealing device of claim 9, further comprising a rupturing member disposed on the casing and which opens the seal member when the liquid agent container moves downward relative to the casing.

13. A sealing device, comprising:
a casing;
a liquid agent container in which a sealing agent is contained, the liquid agent container having a discharge aperture which is sealed by a seal member;
a compressor unit disposed on the casing and which applies air to the liquid agent container;
an injection unit connected to the discharge aperture, wherein the injection unit opens the seal member when the liquid agent container moves downward relative to the casing, and the sealing agent discharges from the discharge aperture; and
a projection projecting upwardly from the casing and which supports the liquid agent container, and wherein a flange comprising a bridging portion is movable with the liquid agent container, and wherein the projection breaks the bridging portion in response to a downward force applied to the liquid agent container.

* * * * *